Dec. 20, 1960  A. BEHRENS ET AL  2,965,358
AIR HEATER SEAL

Filed Sept. 3, 1957  3 Sheets-Sheet 1

INVENTORS
A. Behrens
G. Jackel
BY
ATTORNEY

Dec. 20, 1960  A. BEHRENS ET AL  2,965,358
AIR HEATER SEAL

Filed Sept. 3, 1957  3 Sheets-Sheet 2

INVENTORS
A. Behrens
G. Jackel
BY
*J. P. Moran*
ATTORNEY

Dec. 20, 1960  A. BEHRENS ET AL  2,965,358
AIR HEATER SEAL
Filed Sept. 3, 1957  3 Sheets-Sheet 3
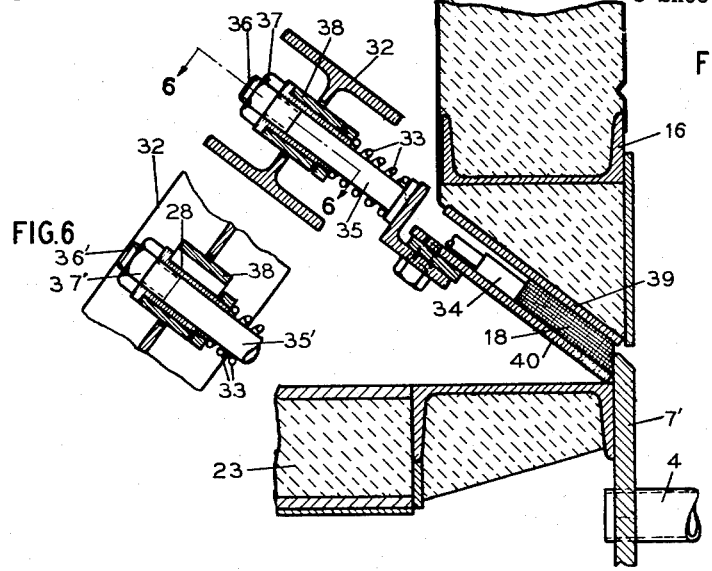
FIG. 5
FIG. 6
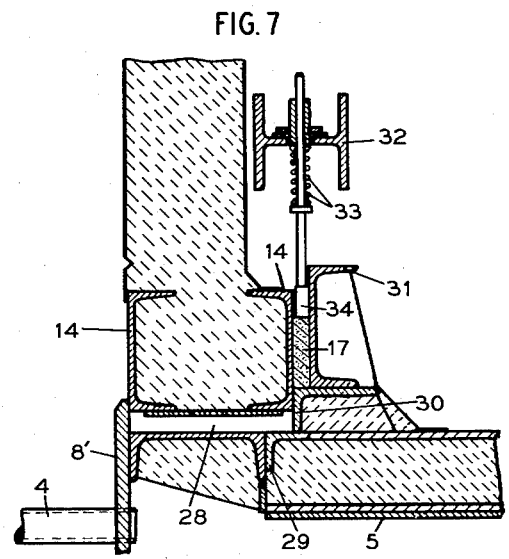
FIG. 7
INVENTORS
A. Behrens
G. Jackel
BY
*J P Moran*
ATTORNEY

United States Patent Office 2,965,358
Patented Dec. 20, 1960

2,965,358
AIR HEATER SEAL

Alfred Behrens and Gerhard Jaekel, Oberhausen, Rhineland, Germany, assignors to The Babcock & Wilcox Company, New York, N.Y., a corporation of New Jersey Filed Sept. 3, 1957, Ser. No. 681,578

Claims priority, application Germany Sept. 6, 1956

7 Claims. (Cl. 257—230)

The present invention relates to expansion seals for a heat exchanger. The invention consists of apparatus for compensating for the thermal expansion differential motions between a fixed position support frame and the movable position of a heat exchanger. The sealing mechanism is constructed and arranged to compensate for movements of the related parts in two and alternately, in three different directions of motion. The thermal expansion of the deflector hood, which can not be compensated by a spring loaded seal because at least part of the deflector hood is parallel to the tube sheet, is provided with a sectional, or slotted, tube in the walls thereof which serves as an elastic compensation piece. The spring loading of the sealing mechanism may be controlled by means of transition pieces and spring loaded bars, while sliding bearings compensate for differential expansion between the supports and the tube sheets.

It is known that the thermal expansion occurring parallel to a plane in a heat exchanger may be compensated by the use of V or U-shaped elements which are intended to prevent the entrance of outside fluids between the movable parts of the heat exchanger. After a long period of use, however, it has been proven that seals, such as heretofore kown, were unable to maintain pressure tightness because of the movements of the parts during heating and cooling of the apparatus. Leaks on the seams of the usual thermal compensators usually occur after extensive operation of the unit. With such disadvantageous occurrences in the seals during normal operating conditions, it is apparent that such conditions would be aggravated when a heat exchanger is operated under a higher than usual internal pressure. When pressures of the order of 6,000 mm. of water pressure are used, it becomes necessary to utilize new ways and means for avoiding leakage of air or gases through the joints of a heat exchanger.

According to the present invention, thermal expansion is handled by new and novel structural elements where the sealing of the sections moving relative to each other is compensated by movable seals which are arranged in guides. The assured separation of the heat transfer medium and the medium to be heated increases the efficiency of the heat exchange unit and the economical conditions for the operation of a high pressure air heater are improved because of the longer periods possible in operation without maintenance.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 5 shows the section through the seal on the free side of the air heater support;

Fig. 6 shows a section along the line 6—6 of Fig. 5; and

Fig. 7 shows a section through the seal on the anchored side of the heat exchanger.

Figure 1:
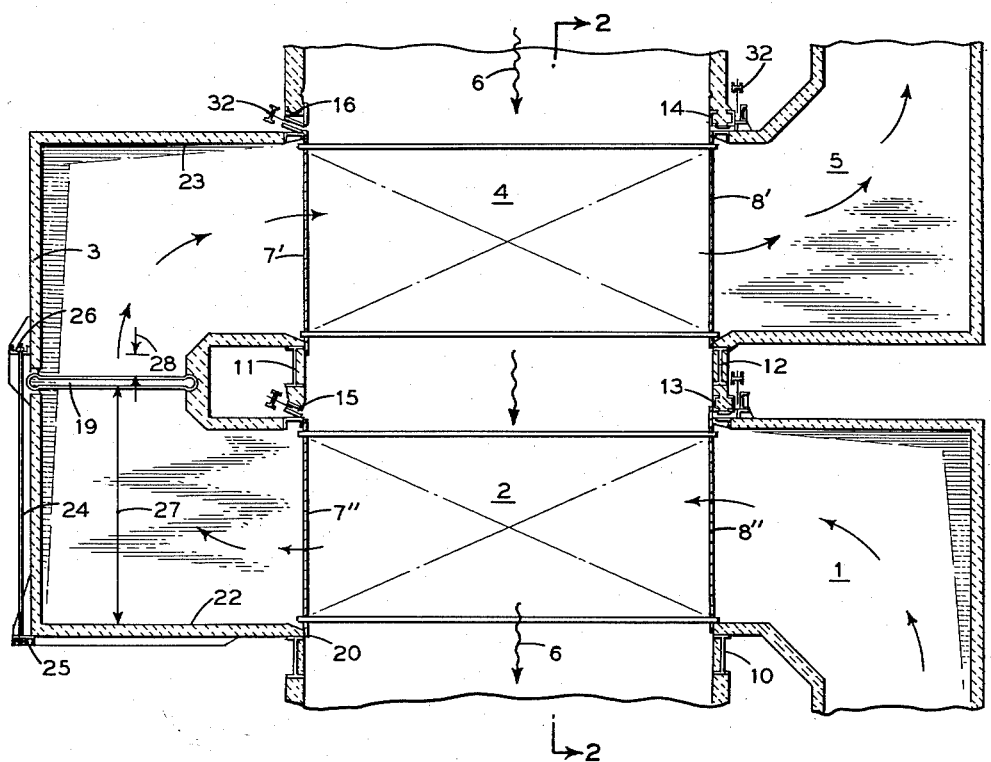
Fig. 1 shows a longitudinal section through a tubular heat exchanger.

The tubular heat exchange shown in Fig. 1 is of generally standard arrangement where the air or the medium to be heated flows into the tubes of tube bundle 2 from the intake duct 1 and then passes through the deflecting hood 3, through the tubes of tube bundle 4 and thence through the outlet duct 5 to the point of use. The hot gases or heat carrying medium flows over the horizontally arranged tubes 4 and 2 in the direction of the arrows 6. Tubes 2 and 4 are fastened on both ends by belling, rolling, or welding to the tube sheets 7″ and 7′ which are attached to the deflector hood 3, and to the sheets 8″ and 8′ at the opposite end. The tube bundles produced by the connection of tubes 2 and 4 with tube sheet 7″ and 8″, 7′ and 8′, respectviely, are supported on a structural frame.

In order to simplify the drawing (Fig. 1) only the lower I-beam supports 9 and 10, the upper I-beam supports 11 and 12, and the channel members 13 of the lower and channel members 14 of the upper anchored portion, as well as the channel members 15 of the lower and 16 of the upper free side have been shown. The seal on the anchored side of the heat exchanger is formed by the sealing packing 17 (see Figs. 4 and 7) and on the free side is formed by the inclined arranged packing 18 (see Fig. 5). The differential expansion within the deflector hood 3 is permitted by a slotted tube 19 which completely surrounds the deflector hood and which is semi-circularly rounded at the corners in order to insure the elasticity of the tube at these points.

Figure 2:
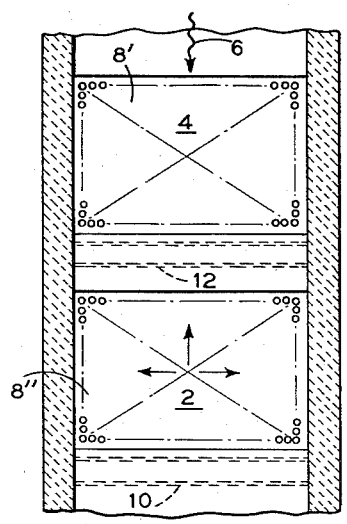
Fig. 2 is a section taken on the line 2—2 of Fig. 1.
Figure 3:
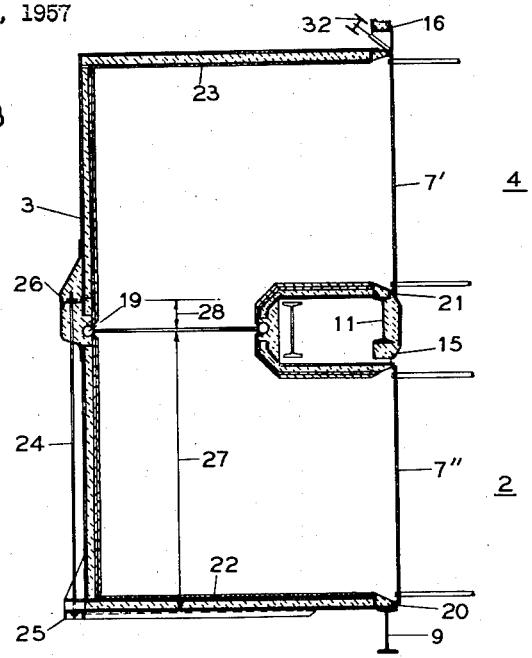
Fig. 3 shows in enlarged sections the deflecting hood shown in Fig. 1.

The deflector hood, which is shown in enlarged sections in Fig. 3, serves to guide the air or other gaseous medium from the tube bundle 2 into the tube bundle 4. The tube sheets 7′ and 7″ of the tube bundles 4 and 2 are supported on the frame by a channel member 20 carried on an I-beam support 9, and the associated channel member 21 resting on the upper I-beam 11. As shown by the arrows drawn in Fig. 2, the thermal expansion of the tube bundles 2 and 4 is upward and to both sides when the heat exchanger is in operation. The expansion in the direction of the arrows is approximately equal in the deflector hood 3 and the tube sheets 7′ and 7″. In the vertical direction, however, the deflector hood 3 has a differential thermal expansion with respect to the tube sheets 7′ and 7″ because of the intermediate position of the tube sheet 7′. Because of this, and in order to simultaneously pick up the high pressures of the medium flowing through the hood, the slotted tube 19 is built into the hood to permit differential thermal expansion of the hood walls and to maintain a gas tight connection of the component parts of the hood.

Apart from the demands imposed by the thermal expansion forces, the walls of the deflector hood are highly loaded due to the pressure of the medium being heated and passing through the hood. Thus, in particular, the high internal pressures imposed upon the walls 22 and 23, has a disadvantageous effect on the slotted tube 19. The affect of these pressures would be to produce an opening of the slotted tube 19 unless provisions were made to absorb this loading by other means. The anchor bars 24 are distributed around the periphery of the deflector hood and are attached to anchor positions 25 and 26 with the bars selected in number and size to correspond to the internal loading on the walls 22 and 23. Thus, the slotted tube 19 is only intended to withstand compression load exerted thereon during operation. The tube 19 is selected of sufficient diameter to compensate for the thermal expansion of the surfaces 27 and 28 of the deflecting hood 3. The thermal expansion of surface 27 starts from the lower anchor position 25 and the channel member 20 while the expansion of the surface 28 is determined by the position of the channel member 21 and the fixed support 26.

Figure 4:
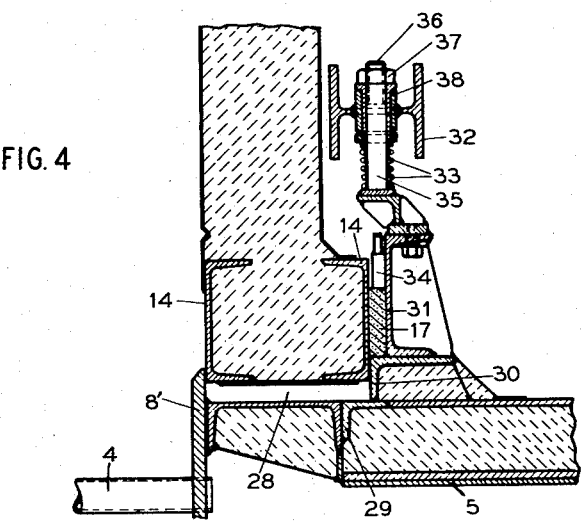
Fig. 4 shows a section through the seal on the anchored side of the air heater support.

As shown in Fig. 1, the tube sheets 8' and 8" of the anchored end of the heat exchanger move in two directions, namely to both sides and upwardly, in the same plane. The tube sheets 7' and 7" of the free side of the heat exchanger undergo additional motion in the direction of the deflector hood 3. This is caused by the thermal expansion of the tube bundles 2 and 4 which exerts a three dimensional motion upon the tube sheets due to the different temperatures of the tubes. Under these circumstances, the sealing mechanism on the anchored side of the heat exchanger is constructed for vertical motion only in the plane of the tube sheets 8' and 8", while the sealing mechanism of the free side is constructed for movement in diagonal directions. The sealing mechanism of the anchored side of the heat exchanger is shown in Figs. 4 and 7 while the sealing arrangement on the free side of the heat exchanger is shown in Figs. 5 and 6.

As compared to the relatively fixed support frame which includes the channel members 13 and 14, the tube sheets 8" and 8' will expand as determined by the dimensions of the sheets and the temperatures at which they are operating. As shown in Fig. 7, the outlet duct 5 (and the supply duct 1) is solidly connected with the tube sheets 8' and 8" respectively with the lower edge of each tube sheet anchored in position with respect to the supporting frame. The upper and side edges of the tube sheets 8' and 8" are provided with the sealing mechanism including the packing 17 as well as the associated structural members 29, 30 and 31 which form the guides for movement of the tube sheets in the plane of the sheets.

The sealing packing 17 is pressed onto the surface to be sealed, namely between the space between the solid frame formed of double channel members 14 and the moveable surface of the angle support 30. This occurs via a support member 32 which may be constructed as an I-beam member, and by means of the spring 33 and sealing strip 34. When the tube sheet 8' moves during operation the packing 17 moves with reference to the channel member 14. The packing seal 17, which consists of asbestos woven with metal cloth retains its elasticity and shape because of the spring 33, which acts upon it. It is thus effective even for higher pressures. As can also be seen more exactly in Fig. 4 the support member 32 is fastened to the profile member 31 together with the tube sheet 8' by means of welding or by screw fittings outside of the outlet duct 5. Bolt 35 with thread 36 permits tightening the nut 37 more or less strongly in order to increase the spring pressure acting on the sealing packing 17. This can be done even during operation.

The free side support 38 (see also Fig. 6), which permits motion in direction of expansion, compensates for differential expansion of the support member 32 and the tube sheet 7'. While the tube sheets 8' and 8" only expand in a two-dimensional direction, the tube sheets 7' and 7" also undergo a lateral motion. From this, one obtains a component shown in Fig. 5 which is directed diagonally upward and this produces a laterally inclined position of the sealing surfaces 39 and 40. The sealing packing 18 moves on these in the same manner as was described for the motion of the sealing packing 17 on the anchored side. The inclination of the two sealing surfaces 39 and 40 is given by the surface expansion of the tube sheet 7', and its motion in the direction of the longitudinal axes of the tubes 4. The sliding support 37 shown in Fig. 6 makes possible differential expansion of the support member 32 and the tube sheet 7' in the same manner as these are compensated for on the anchored side. Here again the spring pressure may be adjusted by tightening of the nut 37' on the thread 36' of the bolt 35'. The connection of the support member 32 to the tube sheet by means of the bolt 35 had best be done at least on the corners of the heat exchanger.

In operation of the air heater, the thermal expansion of the tube sheets 8' and 8" is in the plane of the tube sheets from the anchored edges connected with the I-beams 12 and 10, respectively. The expansion of the tube bundles 4 and 2 will be primarily in the direction of the tube axes with the lower edges of the tube sheets 7' and 7" moving in the direction of the tube axes along the supporting I-beams 11 and 9, and the channels 21 and 20, respectively. Since the thermal expansion of the tube sheets 7' and 7" in their respective planes will be comparable with the thermal expansion of the adjoining portions of the walls of the hood 3, the joints therebetween will not be over stressed thereby. However, since the axial expansion of the tubes of the tube bundle 4 will be greater than the axial expansion of the tubes of tube bundle 2, due to the difference in tube temperatures, the uppermost edge of the tube sheet 7' will move in a diagonal direction. The construction and arrangement of the seal 18, in cooperation with the slotted tube 19 will allow such differential expansion with the upper portion of the hood tilting to the left about the axis formed by the support 26.

While in accordance with the provisions of the statues we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. Fluid heating apparatus comprising at least two bundles of tubes having tube sheets at the opposite ends of each bundle, a hood connecting said tube bundles for series flow of a fluid to be heated through the tubes of said tube bundles, means for passing a heating fluid sequentially over the tubes of said tube bundles and between the tube sheets of each of said bundles, means for supporting the tube sheets of each of said bundles opposite said hood for movement only in a plane normal to the axes of said tubes, means for sealing the edges of said last named tube sheets, means for supporting the hood and the adjacent tube sheets for thermal movement in the direction of said tube axes, and means for sealing the edges of each of said adjacent tube sheets for resultant thermal movement in the plane of said tube sheet and normal thereto.

2. Fluid heating apparatus comprising at least two bundles of tubes having tube sheets at the opposite ends of each bundle, a hood connecting said tube bundles for series flow of a fluid to be heated through the tubes of said tube bundles, means for passing a heating fluid sequentially over the tubes of said tube bundles and between the tube sheets of each of said bundles, one of the tube sheets of each of said bundles opposite said hood being anchored along one edge, the other edges of each of said last named tube sheets being free for thermal movement in the plane of said tube sheet, sealing means for said other edges of said tube sheet, means for supporting the hood and the adjacent tube sheets for thermal movement in the direction of said tube axes, and means for sealing the edges of each of said adjacent tube sheets for resultant thermal movement in the plane of said tube sheet and normal thereto.

3. Fluid heating apparatus comprising at least two bundles of tubes having tube sheets at the opposite ends of each bundle, a hood connecting said tube bundles for series flow of a fluid to be heated through the tubes of said tube bundles, expansion means in the walls of said hood, means for passing a heating fluid over the tubes of said tube bundles and between the tube sheets of each of said bundles, means for supporting the tube sheets of each of said bundles opposite said hood for thermal movement in the plane of the tube sheets, sealing means for the edges of said last named tube sheets, means for supporting the hood and the adjacent tube sheets for thermal movement in the direction of said tube axes, and means for sealing the edges of each of said adjacent tube sheets for resultant thermal movement in a direction in the plane of said tube sheet and normal thereto.

4. Fluid heating apparatus comprising at least two bundles of tubes having tube sheets at the opposite ends of each bundle, the tubes of said bundles being arranged in parallel, a hood connecting said tube bundles for series flow of a fluid to be heated therethrough, means for passing a heating fluid over the tubes of said tube bundles in counterflow relationship to the fluid to be heated and between the tube sheets of each of said bundles, one of the tube sheets of each of said bundles opposite said hood being anchored against movement in the direction of the tube axes, one edge of each of said last named tube sheets being anchored against movement in the plane of the tube sheet, the other edges of each of said last named tube sheets being free for thermal movement in the plane of said tube sheet, sealing means for said other edges of each of said tube sheets, means for supporting the hood and the adjacent tube sheets for thermal movement in a plane parallel to said tube axes, and means for sealing the edges of each of said adjacent tube sheets against resultant thermal movement in a direction in the plane of said tube sheet and normal thereto.

5. Fluid heating apparatus comprising at least two superimposed bundles of horizontally disposed tubes having tube sheets at the opposite ends of each bundle, a hood connecting the discharge end of one tube bundle with the inlet end of the second tube bundle for series flow of a fluid to be heated through the tubes of said tube bundles, means for passing a heating fluid over the tubes of said tube bundles and between the tube sheets of each of said bundles, one of the tube sheets of each of said bundles opposite said hood being anchored against movement in the direction of the tube axes, one edge of each of said last named tube sheets being anchored against movement in the plane of the tube sheet, the other edges of last named tube sheets being free for thermal movement in the plane of said tube sheet, sealing means for said other edges of said tube sheet, means for supporting the hood and the adjacent tube sheets for thermal movement in the direction of said tube axes, and means for sealing the edges of each of said adjacent tube sheets for resultant movement in the plane of said tube sheet and normal thereto.

6. Fluid heating apparatus comprising at least two superimposed bundles of horizontally disposed tubes having tube sheets at the opposite ends of each bundle, a hood conecting the discharge end of one tube bundle with the inlet end of the second tube bundle for series flow of a fluid to be heated through the tubes of said tube bundles, expansion means in said hood positioned in a substantially horizontal plane intermediate said tube bundles, anchor rod means positioned on the exterior of said hood between the levels of the lower edges of said tube sheets, means for passing a heating fluid over the tubes of said tube bundles and between the tube sheets of each of said bundles, one of the tube sheets of each of said bundles opposite said hood being anchored against movement in the direction of the tube axes, one edge of each of said last named tube sheets being anchored against movement in the plane of the tube sheet, the other edges of each of said last named tube sheets being free for thermal movement in the plane of said tube sheet, sealing means for said other edges of each of said last named tube sheets, means for supporting the hood and the adjacent tube sheets for thermal movement in the direction of said tube axes, and means for sealing the edges of each of said adjacent tube sheets for resultant movement in the plane of said tube sheet and normal thereto.

7. Fluid heating apparatus comprising at least two superimposed bundles of horizontally disposed tubes having tube sheets at the opposite ends of each bundle, a hood connecting the discharge end of one tube bundle with the inlet end of the second tube bundle for series flow of a fluid to be heated through the tubes of said tube bundles, means for passing a heating fluid over the tubes of said tube bundles and between the tube sheets of each of said bundles, a continuous slotted tube horizontally disposed in the walls of said hood intermediate the level of said tube bundles for differential expansion of the walls of said hood, anchor rod means positioned on the exterior of said hood between the levels of the lower edges of said tube sheets, one of the tube sheets of each of said bundles opposite said hood being anchored against movement in the direction of the tube axes, one edge of each of said last named tube sheets being anchored against movement in the plane of the tube sheet, the other edges of each said last named tube sheets being free for thermal movement in the plane of said tube sheet, sealing means for said other edges of said tube sheets including vertically positioned guide surfaces and a spring loaded resilient packing material, means for supporting the hood and the adjacent tube sheets for thermal movement in the direction of said tube axes, and means for sealing the edges of each of said adjacent tube sheets for resultant movement in the plane of said tube sheet and normal thereto.

References Cited in the file of this patent

UNITED STATES PATENTS

| | | |
|---|---|---|
| 1,634,821 | Birch | July 5, 1927 |
| 1,734,962 | Clarke | Nov. 12, 1929 |
| 1,804,191 | Whittam | May 5, 1931 |
| 2,460,746 | Guthrie et al. | Feb. 1, 1949 |
| 2,578,783 | Cruise | Dec. 18, 1951 |

FOREIGN PATENTS

| | | |
|---|---|---|
| 526,124 | Great Britain | Sept. 11, 1940 |
| 814,069 | France | Mar. 8, 1937 |